United States Patent [19]

Yamada

[11] Patent Number: 4,946,294
[45] Date of Patent: Aug. 7, 1990

[54] BEARING APPARATUS

[75] Inventor: Takao Yamada, Tokyo, Japan

[73] Assignee: NKK Corporation, Tokyo, Japan

[21] Appl. No.: 302,017

[22] Filed: Jan. 25, 1989

[30] Foreign Application Priority Data

Feb. 1, 1988 [JP] Japan ................................. 63-19475

[51] Int. Cl.⁵ ...................... F16C 29/04; B65G 13/00
[52] U.S. Cl. ................................ 384/49; 193/35 MD
[58] Field of Search .................. 384/7, 49; 16/24, 26, 16/18 R; 193/35 R, 35 MD; 280/79.11; 414/535; 52/167

[56] References Cited

U.S. PATENT DOCUMENTS

| | | | |
|---|---|---|---|
| 449,967 | 4/1891 | Simonds | 384/49 |
| 2,555,078 | 5/1951 | Gaylor | 193/35 MD |
| 3,682,284 | 8/1972 | Sakamoto | 193/35 MD |
| 4,060,252 | 11/1977 | Mowery | 384/49 X |

FOREIGN PATENT DOCUMENTS

| | | | |
|---|---|---|---|
| 1933067 | 1/1971 | Fed. Rep. of Germany | 193/35 R |
| 172609 | 8/1960 | Sweden | 384/49 |
| 612479 | 7/1979 | Switzerland | 384/49 |
| 916599 | 1/1963 | United Kingdom | 384/49 |

*Primary Examiner*—Thomas R. Hannon
*Attorney, Agent, or Firm*—Frishauf, Holtz, Goodman & Woodward

[57] ABSTRACT

A bearing apparatus comprises: a plurality of bearing units, each of the bearing units holding balls so as to have the balls freely rotate and the balls being arranged so as to have a predetermined distance in a relatively positional relation; and a plate for linking the plurality of bearing units on a plane to have the bearing units kept constant in a distance in a relatively positional relation. The bearing units are placed in holes drilled in the linking plate, and are connected to the linking plate slightly loose by a joint mechanism so as for the connection to be flexible during movement of the apparatus. The apparatus can be of 4 to 20 mm in height.

6 Claims, 4 Drawing Sheets

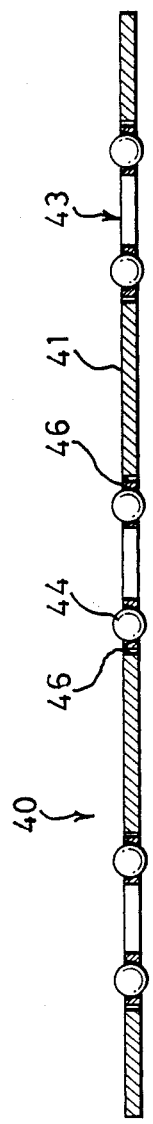
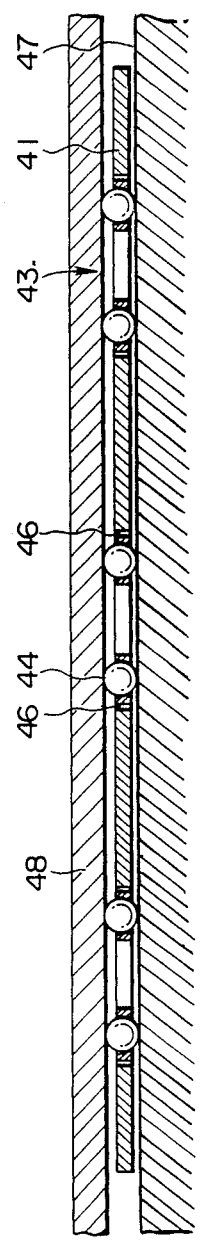

BEARING APPARATUS

BACKGROUND OF THE INVENTION

1. Field of the Invention

The present invention relates to a bearing apparatus capable of supporting a load of a structure and of simultaneously moving the structure easily on a plane, and more particularly to a bearing apparatus capable of doing so for a machinery apparatus having a heavy load.

2. Description of the Prior Arts

A prior art ball bearing device is shown in FIG. 6. Ball bearing 10 is made use of as a mechanism for moving, for example, a table supporting a machine, comprising bed 1, table 2 and retainer 4. This device 10 is fixed on floor slab 5, and has a structure (not shown) to be moved which is laid on table 2 and the structure to be moved straight in a longitudinal axial direction on device 10, namely perpendicularly to the plane surface of FIG. 6 of the drawing.

FIG. 7 is a plan view showing schematically another prior art ball bearing device. Ball bearing device 20 has balls 3 placed in a row in retainer 4, the balls being held respectively in holes drilled in the retainer by means of calking the periphery of each of the holes 22. The holes are slightly larger in diameter than the ball. FIG. 8 is a vertical sectional view showing a construction where in balls 3 and retainer 4, having an arrangement illustrated in FIG. 7, work as a bearing. Bearing device 20 is used in such a case by placing the bearing device between foundation 24 and a structure 25 to be moved, the structure 25 being moved in a direction shown by arrow 26 in FIG. 8 by means of an outside force applied to the structure from the side.

FIG. 9 is a vertical sectional view showing schematically a further prior art ball bearing device. Bearing device 30 has number of small balls 32 accomodated in bearer 31 and spherical body 33 placed on the small balls so as to allow the spherical body to freely rotate on the small balls. The small balls are arranged so as to form two layers through a semi-spherically shaped plate 35 inside bearer 31 as shown in FIG. 9. As the spherical body 33 rotates in the direction of arrow 37 shown in FIG. 9 the small balls also circulate in the direction of arrow 38 of FIG. 9 in bearer 31. If a plurality of bearing devices are arranged on floor slab 34 and flat plate 36 is placed on these bearing devices 30, then, the flat plate can be easily moved. Therefore, when a structure (not shown) is put on the flat plate, the structure can also be easily moved. Of course, the structure can be put directly on spherical body 33, dependent on the bottom shape of the structure if the bottom shape is suitable to do so.

Ball bearing devices 10 and 20, however, are disadvantageous in that the usage of these bearing devices is limited because the direction of moving a structure laid on them is limited to one direction. In case of ball bearing device 30, it has drawbacks in that the ball bearing device can not be used by inserting it in a narrow space because it is high in height. In addition, it is expensive because of its complicated constitution.

SUMMARY OF THE INVENTION

It is an object of the present invention to provide a bearing apparatus which moves a structure loaded thereon, freely in any and all directions as desired on a plane, and which, at the same time, is low in height, simple in constitution and low in price.

In order to attain the object, in accordance with the present invention, a bearing apparatus comprises: a plurality of bearing units, each of the bearing units holding balls so as to have the balls freely rotate and the balls being arranged so as to have a predetermined distance in a relatively positional relation; and means for linking the plurality of the bearing units on a plane to have the bearing units kept constant in a distance in a relatively positional relation, whereby the bearing apparatus moves any and all directions as desired on the plane.

Other objects and advantages of the present invention will become apparent from the detailed description to follow, in conjunction with the appended drawings.

BRIEF DESCRIPTION OF THE DRAWINGS

FIG. 2 is a vertical sectional view of the embodiment of FIG. 1 taken on line II—II of FIG. 1;

FIG. 3 is a sectional view wherein the embodiment of FIG. 1 is installed between a structure to be moved and a floor slab;

DESCRIPTION OF THE PREFERRED EMBODIMENT

Figure 1:
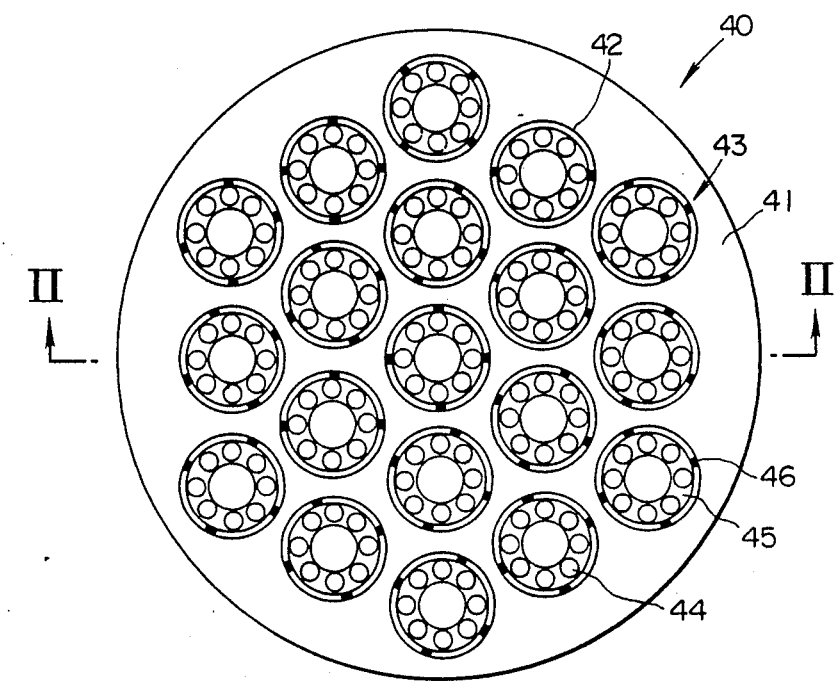
FIG. 1 is a plan view of an embodiment of the apparatus of the present invention.

Now, referring specifically to FIGS. 1 to 3 of the drawings, FIG. 1 shows a plan view illustrating an embodiment of the present invention. FIG. 2 shows a vertical sectional view of the embodiment taken on line II—II of FIG. 1. FIG. 3 shows a view wherein the embodiment of the apparatus is installed between a structure to be moved and floor slab. Referential numeral 40 denotes a bearing apparatus, 41 linking means which is a steel plate and 42 holes which are drilled in the steel plate. 43 denotes a bearing unit. The steel plate 41 holds a plurality of bearing units 43, each, arranged so as to have a predetermined spacing relative to each other in the linking means. In this embodiment, a circular steel plate is used as the linking means, but any appropriate material such as metal or plastic material can be used. Furthermore, the shape can be a polygon such as a triangle, a square and a hexagon.

Bearing unit 43 comprises balls 44, and retainer 45 holding the balls. The balls, each are arranged to have a predetermined spacing from each other. Retainer 45 is shown in this example as being doughnut-shaped. However, the doughnut shape can be a circle or a polygon such as a triangle, a square and a hexagon. Of course, holes 42 are formed to meet the shape of the retainer.

Figure 4:
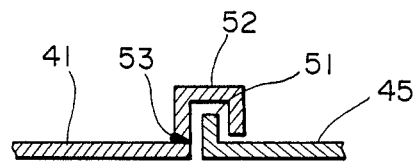
FIGS. 4 and 5 are vertical sectional views, each showing different joint mechanisms of linking means and bearing units of the apparatus of the present invention.
Figure 5:
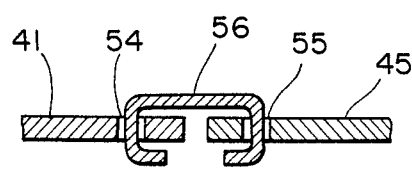
Figure 6:
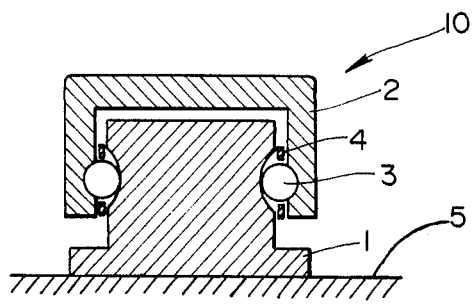
FIG. 6 is a vertical sectional view of a prior art ball bearing device serving as a mechanism for a moving table.
Figure 7:
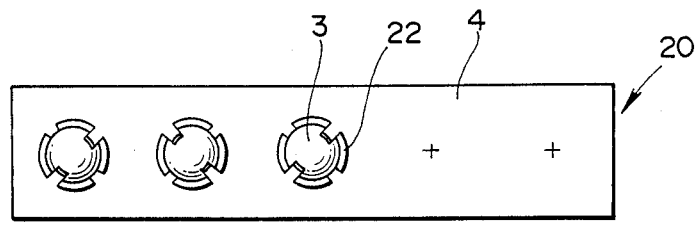
FIG. 7 is a plan view of another prior art ball bearing device.
Figure 8:
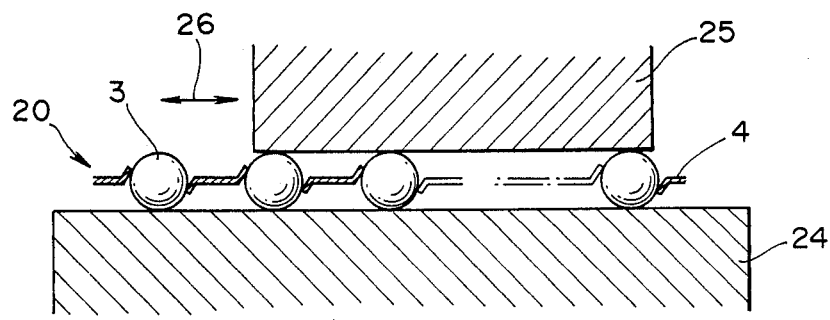
FIG. 8 is a vertical sectional view of the prior art ball bearing device illustrated in FIG. 7.
Figure 9:
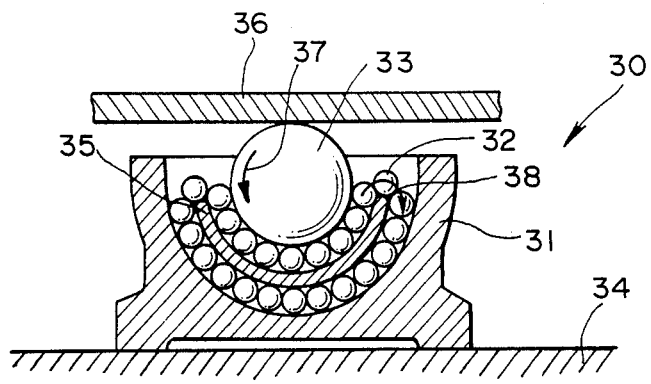
FIG. 9 is a vertical section view of a further prior art ball bearing device having a spherical body laid on small balls.

The operation of the embodiment of the present invention, thus constructed, will now be described with specific reference to FIGS. 1 to 3 of the drawings. Bearing apparatus 40 of the present invention is placed on flat floor 47. The structure (not shown) to be moved is laid, indirectly namely with interposition of flat plate 48 or directly, namely without the interposition of the flat plate, on the bearing apparatus. Then, an outside force is applied to the structure, and thereby the structure is moved in the direction in which the force works on the structure. The direction of the outside force is quite freely chosen i.e. there is no restriction on the direction. As shown in FIG. 1, steel plate 41 is drilled to form a plurality of holes with a diameter slightly larger than that of unit bearing 43, and bearing 43 is put into the respective hole and fixed thereto by welding 46. Connection of bearing units 43 to linking means 41 is not necessarily limited to welding. FIGS. 4 and 5 show vertically and schematically two different joint mechanisms for connecting linking means 41 and retainer 45 of bearing units 43. In FIG. 4, at least a part of an outer peripheral portion of retainer 45 is bent upwardly to form projecting hook portion 51, and engagement portion 52 with a shape such as an upside-down U shape is put loose by over the projecting hook portion 51, the engagement portion 52 protruding on the peripheral portion of hole 42. The engagement portion 52 is separately prepared and fixed to the end of the linking means by welding at weld portion 53. The projecting hook portion 51 can also separately prepared and be fixed to the retainer by welding. Furthermore, the engagement portion 52 can be formed by bending a portion of the linking means at each periphery of holes 42. Furthermore, FIG. 5 also shows another joint mechanism of linking means 41 and retainer 45. Small holes 54 and 55 are drilled, respectively, near a peripheral portion of retainer 45 and near a portion of linking means 41 at each periphery of holes 42. Both end side portions of C-shaped pin piece 56 are inserted into small holes 54 and 55 and the both side tip end portions of the pin piece are curved to thereby complete the joint mechanism. These joint mechanisms can provide a slight allowance to the connection between the linking means and the bearing units in a relative positional relation during the movement operation of apparatus 40 for bearing a structure. Resultantly, the requirement of the flatness of the floor slab, where apparatus 40 operates, is reduced.

In this embodiment of the apparatus of the present invention, it is preferable that balls 44 of high-tensile strength are arranged and packed in a high density, dependent upon a load of a structure to be laid thereon. Furthermore, the higher the arrangement density of the bearing units is, the larger the allowable pressure load of the apparatus becomes. Bearing unit 43 used in this embodiment is a single thrust type ball bearing and comprises retainer 45 of 24–30 mm in outside diameter, balls 44 of about 5 mm in outside diameter and 1000 kg in pressure resistance.

The embodiment of apparatus 40 of the present invention comprises a plurality of bearing units 43 having a plurality of balls 44, the bearing units being arranged on a plane. Therefore, the apparatus is advantageous in that:

(a) A structure can be moved in any direction as desired with a low friction;
(b) A small space can be made use of for the utilization of the apparatus;
(c) The apparatus can be small and resistant in high pressure load; and
(d) The resistance to in high pressure load can be obtained because the bearing units, which have high tensile strength balls packed in a high density, are arranged in a high density.

As an example wherein a bearing apparatus of the present invention is applied will now be described. The apparatus of the present invention can be preferably used for a seismic isolator which works for the purpose of reducing a response acceleration arising out of an earthquake. The seismic isolator is installed between a structure and a foundation or a floor slab. The vibration of the ground due to the earthquake is absorbed in this seismic isolator and then, as a result, a vibration of a structure or equipment loaded on the seismic isolator is softened. Thus, the structure or the equipment is protected from damage caused by an earthquake.

In general, a seismic isolator has means, such as friction plates, springs and elastic substances, for absorbing energy arising from a vibration source, for example, an earthquake and in addition, a part of the energy absorbing means is replaced by a thrust bearing device so as to have the absorbing means adjusted to an appropriate level of energy absorption. The height of the thrust bearing device is desired to be low enough to install a structure, depending on a height space limitation as the case may be. Furthermore, the seismic isolator is required, due to its nature, to have the thrust bearing device moved in various directions as desired and resistible in pressure load of a structure which is laid on and protected by the seismic isolator from an earthquake.

A bearing apparatus of the present invention satisfies the above mentioned conditions for a seismic isolator, because of the advantages of the apparatus. Balls 44 held by bearing units 43 can be 4 to 20 mm in diameter so as to make the height of the apparatus so low because the diameter of each of the balls is equal to the height of bearing units, namely that of the apparatus. If the diameter of the balls is less than 4 mm, the smooth rolling surface of the balls is impaired, while if over 20 mm, the balls will have a smooth rolling surface but they become expensive. In view of a pressure loaded on the seismic isolator, balls with a diameter over 20 mm having a higher strength are not considered to be necessary.

While the preferred form of the present invention has been described, it is to be understood that modifications will be apparent to those skilled in the art without departing from the spirit of the invention. The scope of the present invention, therefore, is to be determined solely by the following claims.

What is claimed is:

1. A bearing apparatus comprising:
   linking means having a plurality of substantially circular holes therein;
   a plurality of substantially circular bearing units, each bearing unit being mounted loosely in a respective substantially circular hole of said linking means; and
   each of said substantially bearing units comprising a plurality of steel balls and a substantially circular shaped retainer, said retainer holding said steel balls in a substantially circular arrangement and said steel balls being rotatingly movable in said retainer and relative to said linking means, said steel balls projecting both from above and below said linking means and said retainer so as to rollingly contact surfaces above and below said steel balls.

2. The apparatus of claim 1, wherein said linking means has a thickness which is less than a diameter of said balls.

3. The apparatus of claim 1, wherein each of said steel balls are about 4 to 20 mm in diameter, and wherein the height of the apparatus is substantially the same as the ball diameter.

4. The apparatus of claim 1, wherein said linking means comprises a substantially flat plate having said plurality of substantially circular holes therein, and wherein said bearing units are mounted loosely in said substantially circular holes of said substantially flat plate.

5. The apparatus of claim 1, further comprising flexible joint means (56) connecting said bearing units to said linking means.

6. The apparatus of claim 1, wherein each of said flexible joint means comprises a generally C-shaped clamp having two legs, said two legs being loosely passed through openings in said bearing unit and linking means, respectively, for loosely connecting said bearing units to said linking means.

* * * * *